United States Patent [19]

Washizuka

[11] 4,103,208

[45] Jul. 25, 1978

[54] FLUORESCENT TUBE DISPLAY CALCULATORS

[75] Inventor: Isamu Washizuka, Kyoto, Japan

[73] Assignee: Sharp Kabushiki Kaisha, Osaka, Japan

[21] Appl. No.: 737,057

[22] Filed: Oct. 29, 1976

[30] Foreign Application Priority Data

Oct. 31, 1975 [JP] Japan .............................. 50/131671

[51] Int. Cl.2 .............................................. H05B 41/36

[52] U.S. Cl. ...................................... 315/51; 313/497; 313/513; 315/58; 315/169 R; 315/325

[58] Field of Search .............. 315/169 TV, 169 R, 51, 315/58, 71, 201, 316, 325, 352; 357/80; 313/496, 497, 513; 340/336

[56] References Cited

U.S. PATENT DOCUMENTS

| | | | |
|---|---|---|---|
| 3,800,178 | 3/1974 | Farina | 313/497 |
| 3,842,313 | 10/1974 | Van Daelen et al. | 315/169 TV |
| 4,004,186 | 1/1977 | Bylander | 313/513 X |

*Primary Examiner*—Eugene R. La Roche

*Attorney, Agent, or Firm*—Birch, Stewart, Kolasch & Birch

[57] ABSTRACT

In one preferred form of calculators, a multi-digit fluorescent display tube and an LSI semiconductor chip together are disposed on a printed circuit flexible film. More particularly, individual components of the multi-digit fluorescent display tube (that is, segmented anode electrodes, grid or accelerator electrodes and a directly heated type filament) and the LSI semiconductor chip are housed within a common package which in turn is disposed directly on the printed circuit flexible film. Connection between the fluorescent display tube and the LSI chip is accomplished by conductor leaves carried on the printed circuit flexible film. In addition, the printed circuit flexible film carries a plurality of stationary key contacts which constitute the keyboard of the calculators.

6 Claims, 7 Drawing Figures

FLUORESCENT TUBE DISPLAY CALCULATORS

BACKGROUND OF THE INVENTION

The present invention relates to a fluorescent tube display useful with electronic calculators.

According to a conventional manner, as is seen from FIG. 1, an electronic calculator comprises a printed circuit flexible film 1, a multi-digit fluorescent tube display 2, a single chip LSI semiconductor 3 and stationary key contacts 4. With respect to the fluorescent tube display 2, see for example U.S. Pat. No. 3,571,655 issued to Akira Tanimoto and entitled ELECTRONIC INDICIA DISPLAY SYSTEM. The respective components have their lead wires which are connected to conductor leaves on the printed circuit flexible film 1 by solder welding. Terminals identified as 6 are to be connected a power source 7. The flexible film 1 further comprises through-hole connections 8 and rear connections 9. With such an arrangement, in case the fluorescent tube display is of the six-digit, eight segment type for example, the fluorescent tube display will be required to have 16 terminals as follows. These terminals should be bonded to the printed circuit flexible film 1 by solder welding.

| | |
|---|---|
| Terminals for digit (or grid) selection | 6 |
| Terminals for segment selection | 8 |
| Terminals for filaments | 2 |

For the LSI semiconductor chip containing a data processor unit, there are 18 terminals to be bonded to the printed circuit flexible film 1 by solder welding.

| | |
|---|---|
| Terminals for timing signals to be supplied to grids and key contacts | 6 |
| Terminals for segment signals | 8 |
| Terminals for key outputs | 2 |
| Terminals for power supply | 2 |

In this way, since the fluorescent tube display 2 and the LSI chip 3 are discrete components, many disadvantages arise, namely: an increased number of components; an increased number of solder weldings; and an increase in manufacturing costs and generation of condemned goods.

Accordingly, it is an object of the present invention to provide an improved fluorescent tube type display useful with electronic calculators or the like which avoids the above discussed disadvantages.

It is another object of the present invention to provide a new construction of combined fluorescent tube type displays and semiconductor chips to thereby assure simplicity in the manufacture thereof.

It is still another object of the present invention to provide an improved fluorescent tube type display wherein connections with the semiconductor chip are accomplished without passing through its external terminals.

It is another object of the present invention to provide an improved fluorescent tube type display in combination with an electronic calculator having a keyboard of the key strobing wherein the respective key switches in the keyboard are connected with the external terminals of the fluorescent tube display.

BRIEF DESCRIPTION OF THE DRAWINGS

A better understanding of the invention may be had from a consideration of the following detailed description taken in conjunction with the accompanying drawings in which.

DETAILED DESCRIPTION OF THE INVENTION

In accordance with one preferred form of the present invention, printed circuit board means serve as a physical support or both a fluorescent tube type display and an LSI semiconductor chip, the individual electrodes in the fluorescent tube display and the individual terminals of the LSI chip being connected via conductor leaves carried on the printed circuit board means without employing known lead wires. Time-shared signals are supplied to the external terminals of the fluorescent tube display. While the drawings illustrate examples of calculators, the concept of the present invention may be equally applicable to other electronic apparatus, for example, electronic desk-top digital clocks.

Figure 1:
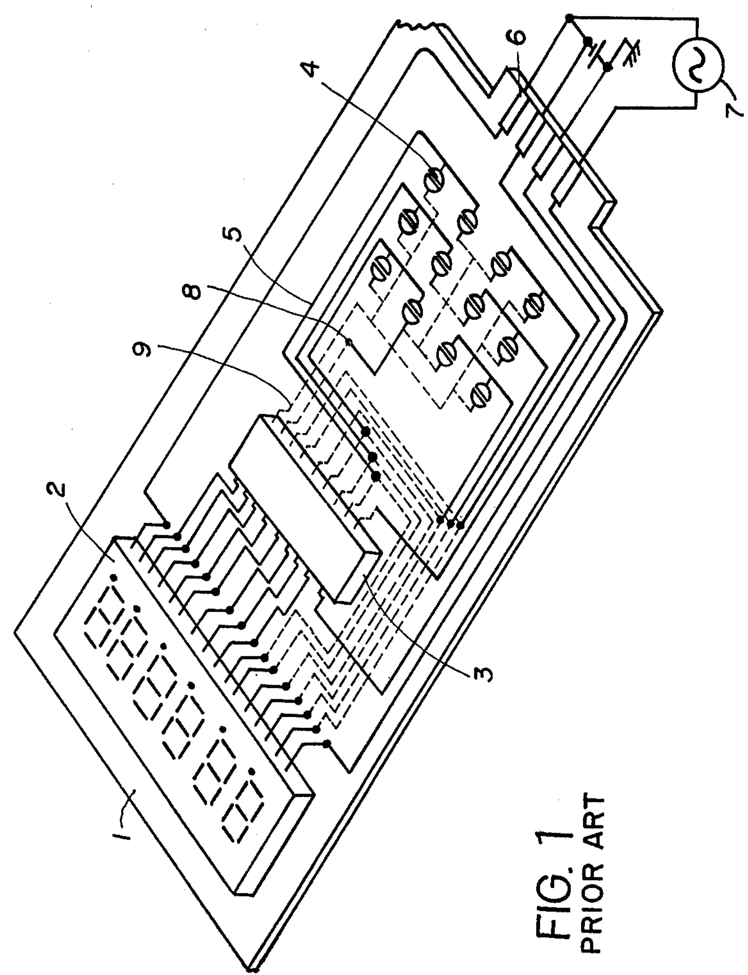
FIG. 1 is a perspective view of a conventional calculator.
Figure 2:
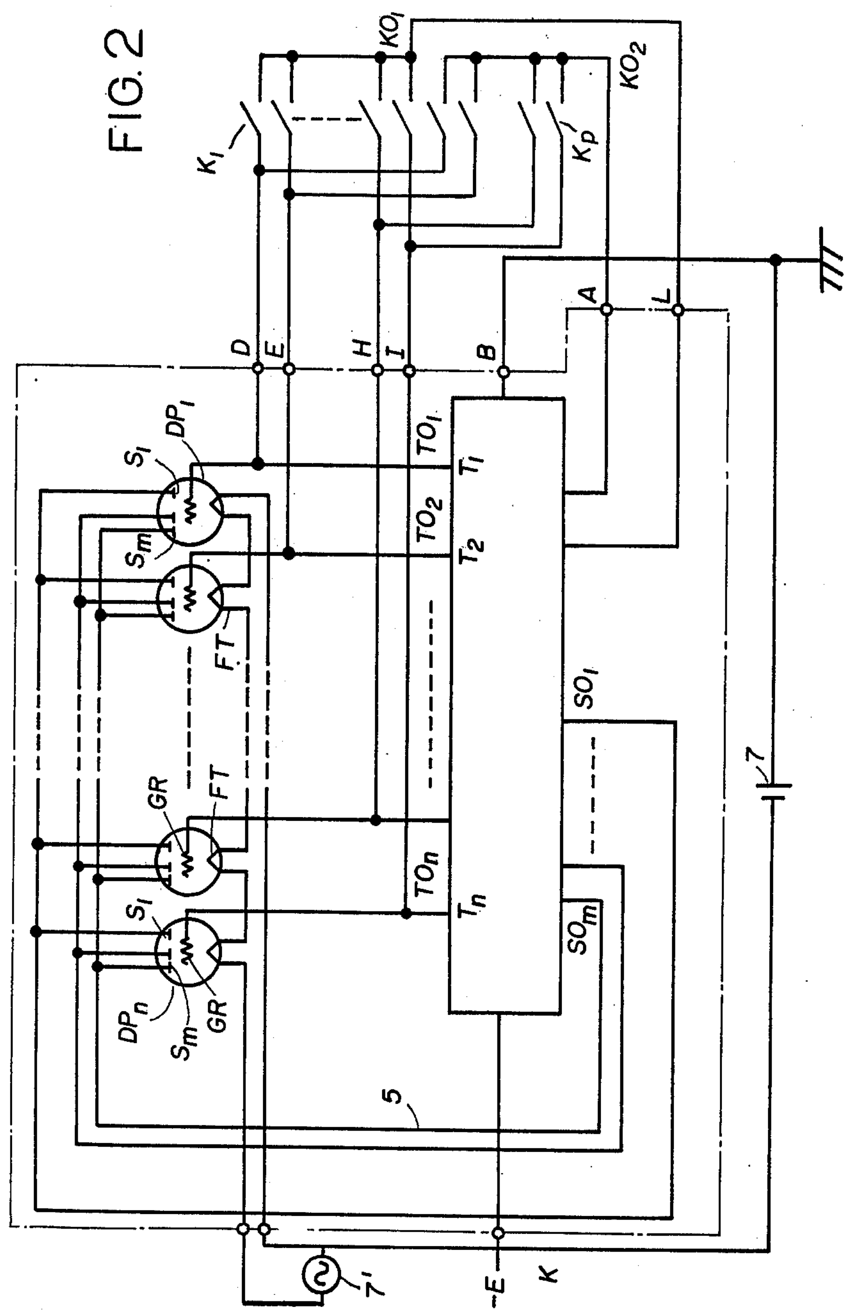
FIG. 2 is a schematic block diagram of a calculator employing a fluorescent tube type display implemented with the present invention.

Referring now to FIG. 2, there is illustrated a schematic block diagram of an electronic calculator employing the fluorescent tube display of the present invention. A portion surrounded by the dashed line corresponds to the fluorescent tube display and LSI chip combination embodying the present invention.

In FIG. 2, the multi-digit fluorescent tube type display comprises a predetermined number of display units $DP_1 - DP_n$ each having a plurality of segmented anode electrodes $S_1 - S_m$, a single grid or accelerator electrode GR and a single filament FT of the directly heated type. The detailed construction of the fluorescent tube display is disclosed and illustrated in the above identified patent. As suggested therein, the filaments FT of the respective display units are serially connected. The serially connected filaments are coupled between the external terminals J, C of the multi-digit fluorescent tube display. The corresponding segment electrodes $S_1 - S_m$ in the respective display units are commonly connected and then the respective ones of the thus commonly connected segment electrodes $S_1 - S_m$ are individually coupled via printed conductor leaves 5 with terminals $SO_1 - SO_m$ of the LSI chip from which segment selection signals are derived. In addition, the respective grid electrodes GR are connected to terminals of the LSI chip from which digit time signals $T_1 - T_n$ called also digit selection signals are respectively derived. These terminals $TO_1 - TO_n$ are coupled with external terminals D–I of the multi-digit fluorescent tube display panel. A family of key switches $K_1 - K_p$ are divided into at least two groups one for numeral entry keys and the other group for function entry keys, the respective keys in the same group being commonly connected. The output terminals $KO_1$, $KO_2$ are external terminals A, L of the fluorescent tube display which in turn are connected to terminals of the LSI chip via conductor leaves formed on the printed circuit board. Corresponding keys in the groups are commonly connected and then to external terminals D–I. B, K represent external terminals for supplying power 7 to the LSI chip and 7 represents an a.c. power source for the filament. Interconnections within the fluorescent tube display are accomplished by the conductor leaves 5 on the board.

The display units $DP_1 - DP_n$ are driven in a time-sharing basis or dynamic mode by application of the digit time signals $T_1 - T_n$ to the respective grids thereof. Key entry is of the key strobing type employing also the digit time signals $T_1 - T_n$. In other words, key determinations are effected by utilizing the fact that only the digit time signal corresponding to a specific depressed key is developed as the key output at either the terminal A or L. Since in the calculator employing such the display driving system and such the key entry system the digit time signals $T_1 - T_n$ are effective for both display purposes and the key strobing purposes, the necessary number of the terminals of the LSI chip is remarkably reduced. The key strobing technique in the art of calculators is disclosed in more detail in U.S. Pat. No. 3,892,957 entitled DIGIT MASK LOGIC COMBINED WITH SEQUENTIALLY ADDRESSED-MEMORY IN ELECTRONIC CALCULATOR CHIP, issued on July 1, 1975 and assigned to Texas Instruments Inc.

With such an arrangement, since the connections between the LSI chip and the display are provided via the conductor leaves on the printed circuit board instead of the external terminals of the display, the need for the step of solder welding between the terminals and the printed circuit board is overcome.

Figure 3:
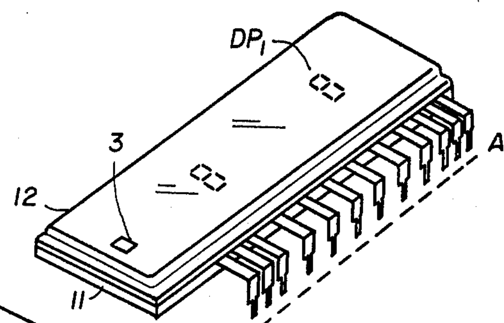
FIGS. 3(A), 3(B) and 3(C) are a simplified perspective view, an exploded perspective view and an enlarged sectional view of the fluorescent tube type display of the present invention in one preferred form.
Figure 3:
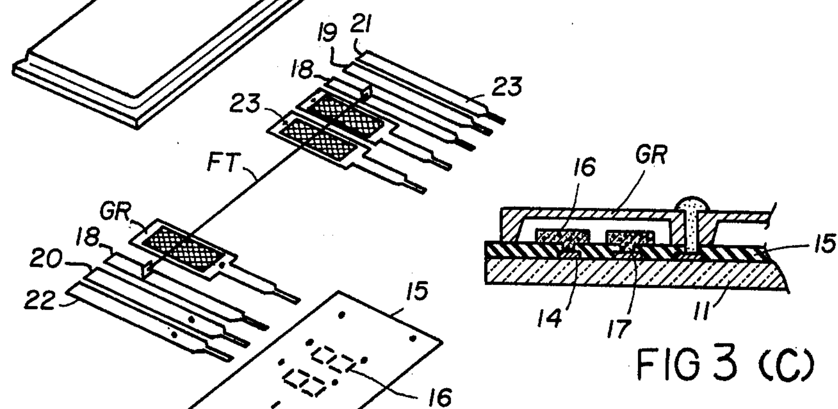
Figure 3:
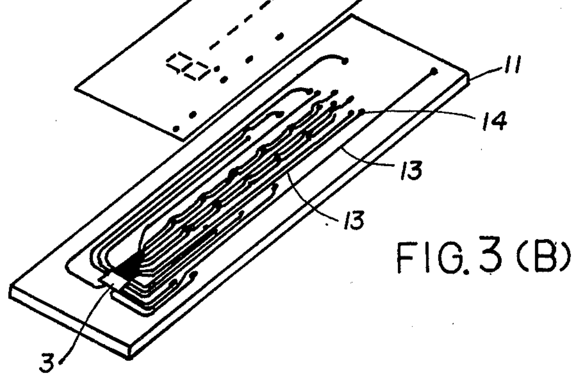

FIGS. 3(A), 3(B) and 3(C) show construction of the multi-digit fluorescent tube display briefly discussed above, wherein FIG. 3(A) is a perspective view. The multi-digit fluorescent tube display and the LSI semiconductor chip are together interposed and sealed between an insulator substrate of glass, plastics, etc. and a transparent cover of glass, plastics, etc. The external terminals A–L extend in the direction of length of the display.

FIG. 3(B) is an exploded perspective view of the display. Printed connections 13 are provided between the LSI chip 3 and the respective electrodes of the display in accordance with well known methods such as evaporation and thick film printing. Dark markings 14 show the junctions of the printed connectors 13 with the external terminals A–L or the fluorescent material. An insulating thin film 15 is painted on the substrate 11 except in positions corresponding to the junction areas 14 and the LSI chip 13. For example, the thin film 15 may be made up by screen printing of glass insulator material. Subsequent to this, the fluorescent material is deposited in a desired segment pattern on that thin film.

As shown in FIG. 3(C), the fluorescent material 16 extends to the junction 14 via holes 17 of the insulator film 15 and electrically comes into contact with the junction. GR is a mesh type grid for each of the display units, the lower end thereof serving as external lead wires. It will be clear from FIG. 3(C) that the grid GR will come into contact with the fluorescent material when the same is mounted directly on the insulator film, provided that the upper end of the grid GR and the lower end of the mesh are somewhat thicker than the other portions thereof. 18 are holders for holding the filament FT, 19, 20 are terminals for power supply for the LSI chip, and 21, 22 are terminals for receiving the key outputs. The external terminals are provided at the junctions 14 with holes 3, through which an electrically conductive paint or electrically conductive adhesive is injected to complete electrical engagement with the junction and fixation onto the substrate. The upper end and lower end of each terminal may be buried into the substrate 11. The cover 12 overlies the substrate 11 carrying the above described components. Thereafter, the fluorescent tube display and the LSI chip are sealed by adhering or welding of the periphery of the cover 21. Air may escape from an exhaust aperture or the interior of the package may be evacuated and sealed. The resulting display inclusive of the LSI chip is illustrated in FIG. 3(A). It should be understood that while the LSI chip packaged by any means is secured on the substrate 1 by solder welding, an LSI chip which is not packaged may be secured directly on the same. In this instance, to prevent deterioration, a spacer may be provided between the display and the LSI chip and thus the LSI chip may be hermetically sealed with the substrate 11, the cover 12 and the spacer. The portion of the cover 12 corresponding to the chip may be opaque to shield radiation of external light.

Figure 4:
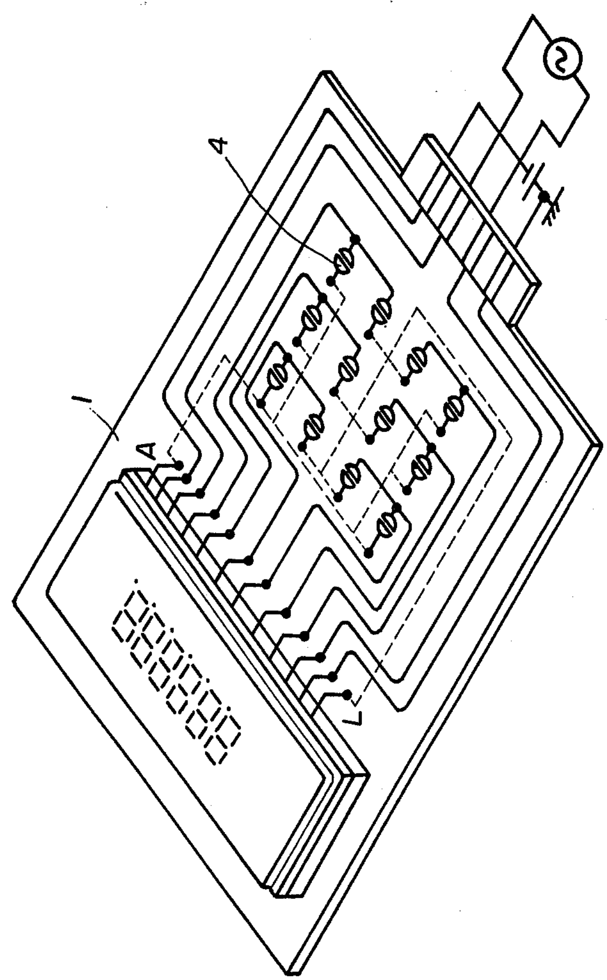
FIG. 4 is a perspective view of a calculator employing the fluorescent tube type display.

FIG. 4 shows an example of an electronic calculator carrying the multi-digit fluorescent tube display as depicted in FIG. 3(A). While the keyboard connections are achieved on the printed circuit board 1, solder welding is carried out only between the external terminals A–L and the printed circuit board 1. The points to be solder-welded are remarkably reduced.

That is, in case of the six-digit and eight-segment display, the calculator of the present invention has only 12 external terminals to be solder welded as follows.

| | |
|---|---|
| Terminals for the digit time signals for key strobing purposes | 6 |
| Terminals for receipt of the key outputs | 2 |
| Terminals for power supply | 2 |

However, in accordance with the prior art there are (16 + 18) points necessary to be solder-welded. Besides, the display of the present invention enables four-terminal reduction.

In this manner, the present invention abolishes the general concept that the display comprises the display electrodes and their associated connections, and is predicated upon a novel concept that the LSI chip, the heart of the electronic apparatus is housed within the display.

Thus, protection for the LSI chip is thoroughly ensured and connections for the LSI chip are performed concurrently with the formation of connections for the display. Further simplicity in manufacture is attained as compared with the prior art that the display and the LSI chip separately prepared are solder-welded onto the printed circuit board. In accordance with the present invention, the steps up to the manufacture of the fluorescent tube display permits connections associated with the LSI chip to be completed.

In addition, in accordance with the present invention the key strobing signals are derived from the external terminals of the display, the calculator or the like may be constituted by connection of the key switches. Space is minimized to facilitate the small-sized calculator or the like because the LSI chip is accommodated within the display tube.

Figure 5:
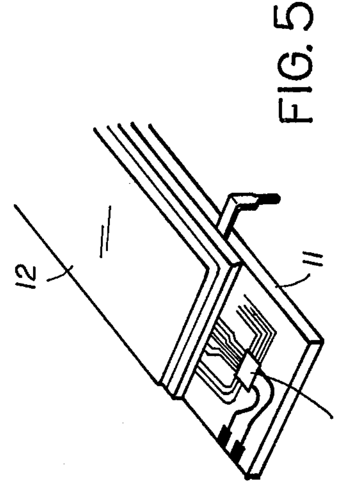
FIG. 5 is a perspective view of another preferred form of the present invention.

While in the given example the LSI chip is housed in the display, the LSI chip may be deposited on an extension of the board 11 out of the display as illustrated in FIG. 5. In this case, a new LSI chip can be substituted easily for a poor one. And, the specifications of the LSI chip can be altered.

While particular representative embodiments and details have been shown for the purpose of those skilled in this art that various changes and modifications may be made without departing from the spirit or scope of the invention. Accordingly, the foregoing embodiments are not to be taken as delimiting examples but as exemplary structures of the invention defined in the claims.

I claim:

1. A fluorescent tube display calculator comprising:
an electrical insulator substrate;
segmented electrodes deposited on the insulator substrate, each of the segmented electrodes being coated with fluorescent material;
a plurality of grids deposited above the segmented electrodes;
a filament deposited above the grids; said segmented electrodes, said grids and said filament in combination constituting the fluorescent tube display;
an LSI semiconductor chip mounted on the insulator substrate;
a package deposited on the insulator substrate for surrounding the fluorescent tube display; and
connections provided between the fluorescent tube display and the LSI semiconductor chip and deposited on the insulator substrate.

2. A fluorescent tube display calculator as set forth in claim 1 further comprising key switch contacts deposited on an insulator substrate.

3. A fluorescent tube display calculator as set forth in claim 1 wherein the connections are made of printed conductor leaves.

4. A fluorescent tube display calculator as set forth in claim 1 wherein said LSI semiconductor chip is disposed on an extension of the insulator substrate outside of the package.

5. A fluorescent tube display calculator comprising:
an electrical insulator substrate;
segmented electrodes deposited on the insulator substrate, each of the segmented electrodes being coated with fluorescent material;
a plurality of grids deposited above the segmented electrodes;
at least one filament desposited above the grids, said segmented electrodes, said grids and said filament in combination constituting a fluorescent tube display;
an LSI semiconductor chip mounted on the insulator substrate;
a package deposited on the insulator substrate for surrounding the fluorescent tube display and the LSI semiconductor chip;
connections provided between the fluorescent tube display and the LSI semiconductor deposited on said insulator substrate;
a plurality of external terminals extending from the package and connected with the respective grids of the fluorescent tube display, said external terminals being provided for deriving grid or digit selection signals for display purposes; and
a plurality of key contacts which constitute a keyboard unit of the calculator, said key contacts being respectively connected to said external terminals of the fluorescent tube display for key strobing purposes.

6. An electronic apparatus having a fluorescent tube display and an LSI semiconductor chip comprising:
an electrical insulator substrate segmented electrodes deposited on the insulator substrate, each of the segmented electrodes being coated with fluorescent material;
a plurality of grids deposited above the segmented electrodes;
a filament deposited above the grids; said segmented electrodes, said grids and said filament in combination constituting the fluorescent tube display;
an LSI semiconductor chip mounted on the insulator substrate;
a package deposited on the insulator substrate for surrounding the fluorescent tube display and the LSI semiconductor chip; and
connections provided between the fluorescent tube display and the LSI semiconductor chip and deposited on the insulator substrate.

* * * * *